May 25, 1948.    W. R. HARRIS    2,442,003
ARC FURNACE ELECTRODE REGULATOR SYSTEM
Filed Nov. 20, 1943
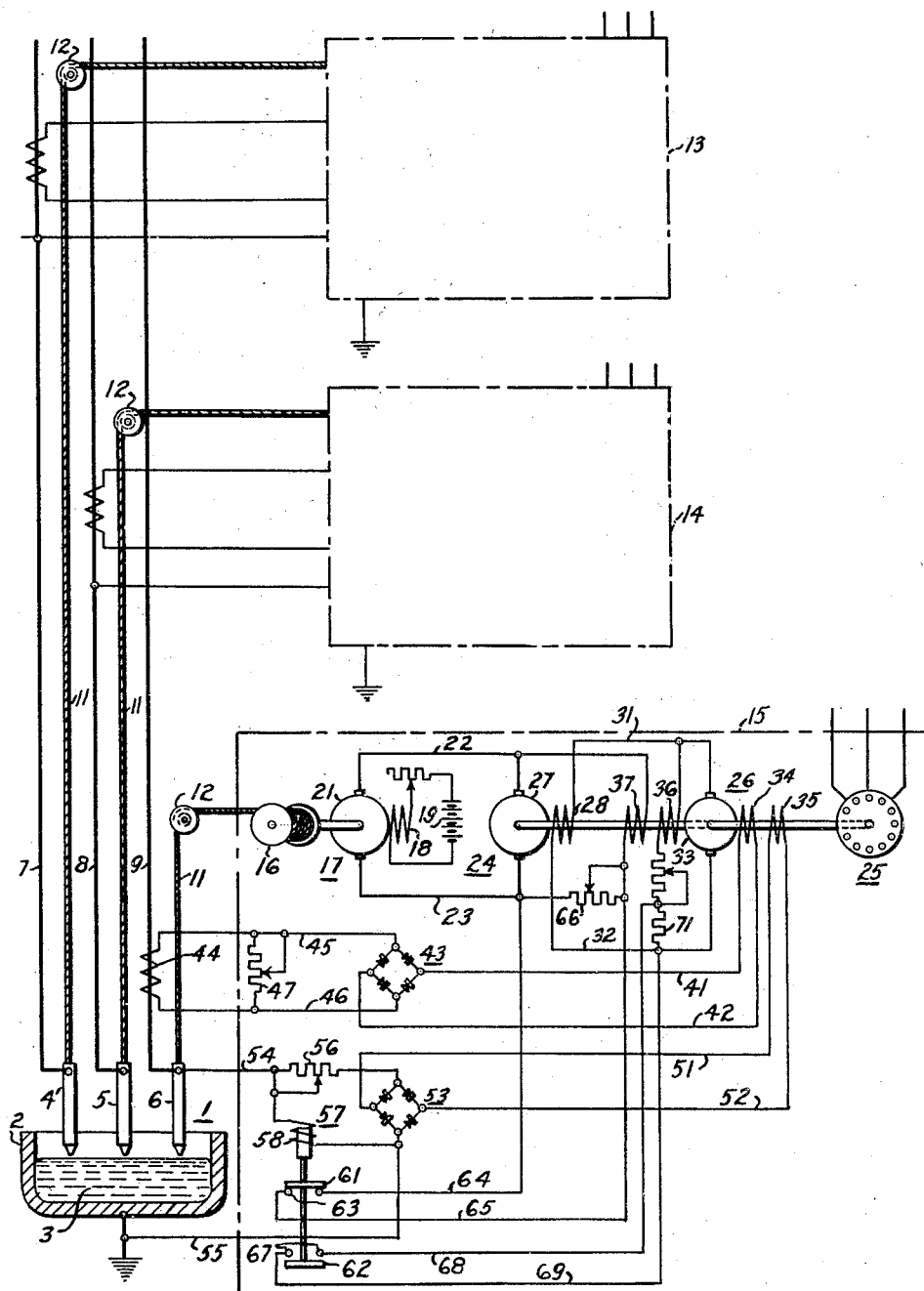
WITNESSES:
INVENTOR
Walter R. Harris.
BY
Franklin E. Hardy
ATTORNEY Patented May 25, 1948

2,442,003

UNITED STATES PATENT OFFICE 2,442,003

ARC FURNACE ELECTRODE REGULATOR SYSTEM

Walter R. Harris, Wilkinsburg, Pa., assignor to Westinghouse Electric Corporation, East Pittsburgh, Pa., a corporation of Pennsylvania Application November 20, 1943, Serial No. 511,195

10 Claims. (Cl. 314—75)

My invention relates to regulator systems and particularly to regulators for governing the operation of the movable electrodes of electric arc furnaces.

In operating an electric furnace of the movable electrode type, it is desirable to automatically raise and lower each electrode in accordance with some furnace condition and to maintain a substantially constant electrode arc. In the furnace regulator systems comprising my invention, each electrode is raised and lowered by means of an electric motor and each electrode motor is controlled both in accordance with the current flowing through the electrode and also in accordance with the voltage obtaining across the arc from the electrode. Consequently, uneven heating arcs are prevented.

It is an object of the invention to provide a furnace regulator system of the above-indicated character in which no contact making control relays are required for controlling the operation of the electrode motor circuits.

It is a further object of the invention to provide a system of the above-indicated character in which the motors which raise and lower the furnace electrodes are supplied with variable voltage power.

It is a still further object of the invention to provide a furnace regulator system in which each electrode motor is supplied from a variable voltage generator in the electrode motor circuit, the field winding of which generator is supplied from an exciter generator whose voltage is governed primarily by the interaction of two opposed field windings energized respectively in accordance with the arc current and the arc voltage.

Other objects and advantages of the invention will be apparent from the following description of a preferred embodiment thereof, reference being had to the accompanying drawing in which the single figure is a diagrammatic view of circuits and apparatus illustrating a preferred embodiment of the invention.

Referring to the drawing, an electric furnace 1 is illustrated having a metal receptacle or shell 2 containing a bath of material 3 and three movable electrodes 4, 5 and 6 which are directly connected, respectively, to alternating-current three-phase supply conductors 7, 8 and 9. Means such as a flexible cable 11 and pulley 12 are provided associated with each of the electrodes for raising and lowering the electrode. Three rectangular areas 13, 14 and 15 are indicated each representing the apparatus associated with the three phases, respectively, for operating the phase electrodes. Since the operating mechanisms for the three phases are identical only one of them is illustrated in detail and enclosed within the rectangular space 15.

As illustrated, the flexible cable 11 may be wound upon a winding drum 16 operated by an electrode motor 17 having a field winding 18 energized from any suitable direct-current source 19, and also having an armature winding 21 shown connected by conductors 22 and 23 to be supplied with energy from a main generator 24 that is driven by an alternating-current motor 25 and excited from the exciter generator 26. The generator 24 is provided with an armature winding 27 connected to the conductors 22 and 23 and with a field winding 28 shown connected through conductors 31 and 32 to be supplied with energy from the armature winding 33 of the exciter generator 26. The exciter generator 26 is shown provided with two control field windings 34 and 35 which are so energized as to oppose each other and may also be provided with a self-exciting winding 36 connected in shunt relation to the armature winding 33 and a differential field winding 37 connected to be energized in accordance with the output voltage of the main generator 24.

The control field winding 34 is shown connected by conductors 41 and 42 to be supplied from a rectifier 43 with a unidirectional current that is a measure of the alternating-current flowing through the phase conductor 9. A current transformer 44 is provided, and is connected through conductors 45 and 46 to the rectifier 43 for supplying alternating current to the rectifier 43. An adjusting resistor 47 is connected between the conductors 45 and 46.

The control field winding 35 is shown connected by conductors 51 and 52 to a full-wave rectifier 53, The alternating-current terminals of which are connected by conductors 54 and 55, respectively, to the electrode 6 and to the shell or casing 2, so that the rectifier 53 will supply energization to the field winding 35 at a voltage that is a measure of the drop in voltage across the furnace arc. An adjusting resistor 56 is provided in conductor 54 to adjust the voltage supplied to the rectifier 53 with respect to that across the furnace arc. A relay 57 is provided having a winding 58 connected between conductors 54 and 55 so as to operate in response to a predetermined voltage between the electrode 6 and the casing 2 for a purpose to be later explained.

When the operation of the furnace is started, the three electrodes 4, 5 and 6 will be in a raised position out of contact with the material 3 to be heated in the furnace receptacle. Under these conditions, no current will be flowing through the electrodes 4, 5 and 6 and no current will be flowing through the control field winding 34 which is supplied with current at a voltage that is a measure of the current through the phase circuit conductor 9. The voltage between electrode 6 and the shell 2 will, however, be a maximum, thus causing the winding 58 of the relay 57 to be energized and causing the control field winding 35 to be fully energized. The flux produced by the winding 35 of the exciter generator 26 develops a voltage which is applied to the main generator field winding 28 having a polarity causing the main generator voltage to build up in a direction to operate the motor 17 to move the electrode 6 downwardly. As the exciter voltage in the armature 33 builds up, the flow of current through the self-energizing field winding 36 increases to increase the rate of voltage buildup of the exciter generator 26, thus causing this voltage to build up more rapidly than it otherwise would. As the voltage of the main generator 24 builds up, as a result of the increasing energization of the field winding 28, a correspondingly increasing voltage is impressed upon the differential field winding 37 from the main generator armature 27, which opposes the effect of the self-energizing field winding 36 to introduce an anti-hunting action limiting the rapidly increasing output voltage of the exciter generator 26.

The winding 58 of the relay 57 is also energized in accordance with the voltage between the electrode 6 and the shell 2. The relay 57 may be so adjusted as to pick up at a voltage of, say, 20% of the normal furnace arc voltage so that under the conditions existing the energization of the winding 58 will be sufficient to move the relay contact members 61 and 62 upwardly from their illustrated positions, thus interrupting the circuit through conductors 64 and 65 illustrated as closed, and inserting the resistor 66 in series between the armature winding 27 and the differential field winding 37 to limit or reduce the energization of this field winding. At the same time, the contact member 62 closes a circuit through contact members 67 and conductors 68 and 69 shunting the resistor 71 from the circuit extending from the exciter generator armature 33 to the self-exciting field winding 36, thus increasing the effectiveness of this field winding. The operation of the relay 57, therefore, to its energized position increases the voltage output of the exciter generator 26 and of the main generator 24 both by increasing the effectiveness of the self-exciting winding 36 and decreasing the effectiveness of the differential and antihunting winding 37.

When the three electrodes 4, 5 and 6, are being lowered, and the first one engages the bath 3, the voltage of the arc impressed across the relay winding 58 and also the control field winding 35 associated with that electrode collapses, that is, drops to a very low value. Thus the control field winding 35 is, in effect, shorted out of service and as the voltage on the control field winding 35 collapses it causes a corresponding reduction in the output voltage of the exciter generator 26 and of the main generator 24, which is applied to the electrode motor 17. This voltage is still further reduced by the operation of the relay 57, which when it becomes deenergized, introduces the resistor 71 in series with the self-exciting field winding 36 thus further reducing the exciter generator output and also by shunting the resistor 66 from the circuit of the differential winding 37 causing this winding to still further oppose the effect of the control winding 35, so that the two field windings 36 and 37 neutralize the effect of the control winding 35 and also the effect of residual magnetism in the machine 26 to decrease its voltage output to substantially zero and thus stop the operation of the electrode motor 17. When one of the other electrodes is lowered sufficiently to also engage the bath 3, so that current starts to flow through the bath between the electrodes, a resistance drop in voltage between the electrodes and the casing 2 appears, thus causing an increase in the voltage between the electrodes and the casing 2, and across the relay winding 58 and on the control field winding 35. The relay 57, therefore, operates to its upper or energized position, increasing the effectiveness of the self-energizing winding 36 and limiting the effectiveness of the differential field winding 37, as described. The effect of the control field winding 35 on the exciter generator 26 is in a direction to tend to operate the motor 17 in a direction to lower the elecrode 6 as above explained. However, since current is now flowing through the conductor 9, a voltage is applied from the current transformer 44 through rectifier 43 to the control field winding 34 in a direction to oppose the flux developed by the field winding 35. The direction in which the motor 17 will now operate is, therefore, dependent upon which of the two control field windings 34 or 35 predominates.

When the flux produced by the field winding 34 is greater than the produced by the winding 35, the resulting flux will cause the exciting generator 26 to develop a voltage having a polarity such as to energize the main generator field winding 28 in a direction to impress a voltage on the motor armature 21 having a polarity to cause the motor 17 to operate in a direction to raise the electrode 6. In a similar manner, if the flux developed by the control field winding 35 is greater than that developed by the control field winding 34, the polarity of the voltage developed by the auxiliary exciter generator 26 will be reversed thus impressing a voltage on the armature 21 of the motor 17 such as to cause the electrode 6 to be lowered. When the electrode is raised the arc is lengthened, the arc current decreases and the arc voltage increases and when the electrode is lowered the arc current increases and the arc voltage decreases. The resulting effect is to move the electrode 6 to such a position that the flux developed by the two control field windings 34 and 35 neutralize each other, in which position the electrode motor 17 will be at rest.

During the normal operation of the regulator, the relay 57 is in its upper or energized position and the electrode 6 is held in such a position that the energization of the two opposed control field windings 34 and 35 neutralize each other. The regulator may be adjusted so that this occurs at the desired arc current and arc voltage values by adjusting the resistors 41 and 56. When the voltage of the exciter generator 26 starts to build up in either direction due to furnace conditions causing an unbalance in the energization of the field windings 34 and 35, the self-exciting field winding 36 will cause a more rapid build up of the exciter generator output voltage followed by an anti-hunting action from the differential field winding 37 when the corresponding response in the build up of the main exciter generator takes place.

The main purpose of the relay 57 is to cause a modification in the normal operation of the exciter generator field windings 36 and 37 to neutralize the effect of the residual magnetism in the exciter generator 26 to prevent creeping of the motor 17 which might otherwise occur due to the small voltage that might be generated as a result of residual excitation. It may be found in certain applications that one only of those circuits controlled by the relay contact members 61 and 62 will be sufficient to give the necessary correction and to neutralize the effect of residual magnetism or in machines where this magnetism is very small, it may be found unnecessary to employ either.

As will readily appear, modifications in the circuits and apparatus illustrated and described will occur to those skilled in the art without departing from the spirit of my invention and I do not wish to be limited otherwise than by the scope of the appended claims.

I claim as my invention:

1. In a furnace-regulator system, a movable electrode, a regulator for governing the operation of said electrode and comprising an electrode motor, a main generator for supplying energy thereto in either of two polarities for operating the motor in either of two directions, and an exciter generator having a plurality of control field windings energized in accordance with the electrical conditions of the electrode circuit, a self-energizing field winding energized in accordance with the energization of said exciter generator, and a differential field winding energized in accordance with the voltage of the main generator.

2. In a furnace-regulator system, the combination with a movable electrode, a motor for operating the electrode, and a main generator continuously connected to the motor, of means for governing the operation of the motor to maintain a substantially constant arc, said means comprising an exciter generator connected for exciting the main generator and provided with oppositely energized control field windings for the exciter generator, means for energizing one of said pair of control field windings with a current that is a measure of the current flowing through the arc and means for energizing the other one of said pair of field windings with a current that is a measure of the voltage across the arc, said exciter generator also having a self-energizing field winding energized in accordance with the energization of said exciter generator, and a differential field winding that is energized in accordance with the voltage of the main generator.

3. In a furnace-regulator system, the combination with a movable electrode, a motor for operating the electrode, and a main generator continuously connected to the motor, of means for governing the operation of the motor to maintain a substantially constant arc, said means comprising an exciter generator connected for exciting the main generator and provided with oppositely energized control field windings for the exciter generator, means for energizing one of said pair of control field windings with a current that is a measure of the current flowing through the arc and means for energizing the other one of said pair of field windings with a current that is a measure of the voltage across the arc, said exciter generator also having a self-energizing field winding connected to be energized in accordance with the output voltage of the exciter for increasing the rate of voltage change thereof, and a differential field winding for the exciter generator connected to be energized in accordance with the voltage of the main generator, a resistor in series circuit with said self-energizing field and relay contacts for closing a circuit in shunt relation to said resistor, a resistor in series circuit with said differential field and relay contacts for closing a circuit in shunt relation to said resistor, and means responsive to the voltage across the arc for shunting the first-named resistor from the self-energizing field winding circuit and for inserting the second-named resistor in circuit with the differential field winding.

4. In a furnace-regulator system, the combination with a movable electrode, a motor for operating the electrode, and a main generator continuously connected to the motor, of means for governing the operation of the motor to maintain a substantially constant arc, said means comprising an exciter generator connected for exciting the main generator and provided with oppositely energized control field windings for the exciter generator, means for energizing one of said pair of control field windings with a current that is a measure of the current flowing through the arc and means for energizing the other one of said pair of field windings with a current that is a measure of the voltage across the arc, said exciter generator also having a self-energizing field winding connected to be energized in accordance with the output voltage of the exciter for increasing the rate of voltage change thereof, and a differential field winding for the exciter generator connected to be energized in accordance with the voltage of the main generator, a resistor in series circuit with said differential field winding and relay contacts for closing a circuit in shunt relation to said resistor, and means responsive to the voltage across the arc for inserting the resistor in circuit with the differential field winding when the voltage across the arc is above a predetermined value and for shunting the resistor from the differential field winding circuit when the voltage across the arc is below a predetermined value.

5. In a furnace-regulator system, a movable electrode, a regulator for governing the operation of said electrode and comprising an electrode motor, a main generator for supplying energy thereto in either of two polarities for operating the motor in either of two directions, and an exciter generator having a plurality of control field windings energized in accordance with the electrical conditions of the electrode circuit, and a differential field winding energized in accordance with the voltage of the main generator.

6. In a furnace-regulator system, the combination with a movable electrode, a motor for operating the electrode, and a main generator continuously connected to the motor, of means for governing the operation of the motor to maintain a substantially constant arc, said means comprising an exciter generator connected for exciting the main generator and provided with oppositely energized control field windings for the exciter generator, means for energizing one of said pair of control field windings with a current that is a measure of the current flowing through the arc and means for energizing the other one of said pair of field windings with a current that is a measure of the voltage across the arc, said exciter generator also having a differential field winding for the exciter generator connected to be energized in accordance with the voltage of the main generator, a resistor in series circuit with said differential field and relay contacts for closing a circuit in shunt relation to said resistor, and means responsive to the voltage across the arc for inserting the resistor in circuit with the differential field winding.

7. In a furnace-regulator system, the combination with a movable electrode, a motor for operating the electrode, and a main generator continuously connected to the motor, of means for governing the operation of the motor to maintain a substantially constant arc, said means comprising an exciter generator connected for exciting the main generator and provided with oppositely energized control field windings for the exciter generator, means for energizing one of said pair of control field windings with a current that is a measure of the current flowing through the arc and means for energizing the other one of said pair of field windings with a current that is a measure of the voltage across the arc, said exciter generator also having a self-energizing field winding connected to be energized in accordance with the output voltage of the exciter for increasing the rate of voltage change thereof, and a differential field winding for the exciter generator connected to be energized in accordance with the voltage of the main generator.

8. In a furnace-regulator system, the combination with a movable electrode, a motor for operating the electrode, and a main generator continuously connected to the motor, of means for governing the operation of the motor to maintain a substantially constant arc, said means comprising an exciter generator connected for exciting the main generator and provided with oppositely energized control field windings for the exciter generator, means for energizing one of said pair of control field windings with a current that is a measure of the current flowing through the arc and means for energizing the other one of said pair of field windings with a current that is a measure of the voltage across the arc, said exciter generator also having a self-energizing field winding connected to be energized in accordance with the output voltage of the exciter for increasing the rate of voltage change thereof, a resistor in series circuit with said self-energizing field and relay contacts for closing a circuit in shunt relation to said resistor, and means responsive to the voltage across the arc for shunting said resistor from the self-energizing field winding circuit.

9. In a furnace-regulator system, the combination with a movable electrode, a motor for operating the electrode, and a main generator continuously connected to the motor, of means for governing the operation of the motor to maintain a substantially constant arc, said means comprising an exciter generator connected for exciting the main generator and provided with oppositely energized control field windings for the exciter generator, means for energizing one of said pair of control field windings with a current that is a measure of the current flowing through the arc and means for energizing the other one of said pair of field windings with a current that is a measure of the voltage across the arc, said exciter generator also having a differential field winding for the exciter generator connected to be energized in accordance with the voltage of the main generator, a resistor in series circuit with said differential field winding and relay contacts for closing a circuit in shunt relation to said resistor, and means responsive to the voltage across the arc for inserting the resistor in circuit with the differential field winding when the voltage across the arc is above a predetermined value and for shunting the resistor from the differential field winding circuit when the voltage across the arc is below a predetermined value.

10. In a furnace-regulator system, the combination with a movable electrode, a motor for operating the electrode, and a main generator continuously connected to the motor, of means for governing the operation of the motor to maintain a substantially constant arc, said means comprising an exciter generator connected for exciting the main generator and provided with oppositely energized control field windings for the exciter generator, means for energizing one of said pair of control field windings with a current that is a measure of the current flowing through the arc and means for energizing the other one of said pair of field windings with a current that is a measure of the voltage across the arc, said exciter generator also having a differential field winding for the exciter generator connected to be energized in accordance with the voltage of the main generator.

WALTER R. HARRIS.

REFERENCES CITED

The following references are of record in the file of this patent:

UNITED STATES PATENTS

| Number | Name | Date |
|---|---|---|
| 1,989,546 | Chapman | Jan. 29, 1935 |
| 2,007,751 | Chapman | July 9, 1935 |